US008819828B1

(12) United States Patent
Umland et al.

(10) Patent No.: US 8,819,828 B1
(45) Date of Patent: Aug. 26, 2014

(54) SYSTEMS AND METHODS FOR IDENTIFYING MALWARE THREAT VECTORS

(75) Inventors: Torrey Umland, Los Angeles, CA (US); Joseph Chen, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/457,152

(22) Filed: Apr. 26, 2012

(51) Int. Cl.
| | | |
|---|---|---|
| *G06F 11/00* | (2006.01) | |
| *G06F 12/14* | (2006.01) | |
| *G06F 12/16* | (2006.01) | |
| *G06F 21/55* | (2013.01) | |
| *G06F 21/56* | (2013.01) | |

(52) U.S. Cl.
CPC ............... *G06F 21/55* (2013.01); *G06F 21/56* (2013.01); *G06F 21/554* (2013.01); *G06F 21/566* (2013.01)
USPC ............................................. 726/24; 726/23

(58) Field of Classification Search
CPC .................................. G06F 21/82; G06F 21/83
See application file for complete search history.

(56) References Cited

U.S. PATENT DOCUMENTS

| 2006/0143716 | A1* | 6/2006 | Ikemoto ........................... 726/27 |
| 2013/0014221 | A1* | 1/2013 | Moore et al. ...................... 726/3 |
| 2013/0227691 | A1* | 8/2013 | Aziz et al. ....................... 726/24 |

OTHER PUBLICATIONS

Adrian Crenshaw, "Plug and Prey: Malicious USB Devices", 2011, "http://www.irongeek.com/i.php?page=security/plug-and-prey-malicious-usb-devices" or PDF version: "http://www.irongeek.com/downloads/Malicious%20USB%20Devices.pdf".*
Dan Goodin; Hackers Pierce Network with Jerry-Rigged Mouse; The Register; Jun. 27, 2011; http://www.theregister.co.uk/2011/06/27/mission_impossible_mouse_attack/.
Kim Zetter; How Digital Detectives Deciphered Stuxnet, the Most Menacing Malware in History; Wired.com. Jul. 11, 2011; http://www.wired.com/threatlevel/2011/07/how-digital-detectives-deciphered-stuxnet/all/1.
Hak5 Forums; Duckhunt Usb Attack Prevention Tool for Windows ZP, Vista and 7; Apr. 16, 2010; http://forums.hak5.org/index.php?showtopic=16255.

* cited by examiner

*Primary Examiner* — Andrew Nalven
*Assistant Examiner* — Quy Pham
(74) *Attorney, Agent, or Firm* — ALG Intellectual Property, LLC

(57) ABSTRACT

A computer-implemented method for identifying malware threat vectors may include 1) identifying a computing system that includes a first human interface device, 2) detecting an introduction of a new device to the computing system that presents itself to the computing system as a second human interface device, 3) determining that the second human interface device is configured to generate a type of input event equivalent to the type of input event generated by the first human interface device, 4) determining, based on the second human interface device being configured to generate the type of input event equivalent to the type of input event generated by the first human interface device, that the second human interface device includes a potential malware attack vector. Various other methods, systems, and computer-readable media are also disclosed.

20 Claims, 6 Drawing Sheets

SYSTEMS AND METHODS FOR IDENTIFYING MALWARE THREAT VECTORS

BACKGROUND

Consumers and businesses face a growing tide of malicious software that threatens the stability and performance of their computers and the security of their data. Computer programmers with malicious motivations have created and continue to create viruses, Trojan horses, worms and other programs in an attempt to compromise computer systems. These malicious programs are often referred to as malware.

Malware authors are constantly innovating to devise new methods for delivering their malware. In one attack, a device may be configured to present to computing systems as a human interface device, but may instead include a microcontroller programmed to submit malicious inputs when installed (e.g., to access unwanted and/or malicious Internet resources, such as advertisements or executable files). For example, a malicious Universal Serial Bus ("USB") device may be designed to look like a USB flash drive, but may register with a computing system as a human interface device (e.g., a keyboard, a mouse, etc.). When a curious user plugs the device into a computing system, an operating system may automatically install a generic device driver for the device and immediately accept any inputs from the device (e.g., keyboard events, mouse events, etc.), allowing the device to control the computing system. Accordingly, the instant disclosure identifies and addresses a need for additional and improved systems and methods for identifying malware threat vectors.

SUMMARY

As will be described in greater detail below, the instant disclosure generally relates to systems and methods for identifying malware threat vectors by identifying the introduction of devices to computing systems that present to the computing systems as human interface devices of a type already extant in the computing systems.

In one example, a computer-implemented method for identifying malware threat vectors may include 1) identifying a computing system that includes a first human interface device, 2) detecting an introduction of a new device to the computing system that presents itself to the computing system as a second human interface device, 3) determining that the second human interface device is configured to generate a type of input event equivalent to the type of input event generated by the first human interface device, 4) determining, based on the second human interface device being configured to generate the type of input event equivalent to the type of input event generated by the first human interface device, that the second human interface device includes a potential malware attack vector.

In some examples, detecting the introduction of the new device may include identifying an installation of a driver for the second human interface device on the computing system.

In some embodiments, determining that the second human interface device includes a potential malware attack vector may include 1) identifying a set of inputs generated by the second human interface device to the computing system, 2) identifying at least one expected attribute of human-generated inputs provided by the second human interface device, and 3) analyzing the set of inputs to determine that the set of inputs does not have the expected attribute. In these embodiments, the expected attribute may include any of a variety of attributes, including 1) a frequency of input, 2) a timing of input, 3) a precision of input, and/or 4) an accuracy of input. Additionally or alternatively, in these embodiments identifying the expected attribute may include 1) identifying a history of input provided via the first human interface device and 2) analyzing the history of input to extract the expected attribute.

In one example, the computer-implemented method may also include blocking at least one input from the second human interface device based at least in part on determining that the second human interface device includes the potential malware attack vector. Additionally or alternatively, the computer-implemented method may also include prompting a user to input, via a human interface device apart from the second human interface device, whether to allow input from the second human interface device. In some examples, the computer-implemented method may also include prompting a user to indicate whether the new device is a human interface device.

In one embodiment, a system for implementing the above-described method may include 1) an identification module programmed to identify a computing system that includes a first human interface device, 2) a detection module programmed to detect an introduction of a new device to the computing system that presents itself to the computing system as a second human interface device, 3) an equivalence module programmed to determine that the second human interface device is configured to generate a type of input event equivalent to the type of input event generated by the first human interface device, and 4) a determination module programmed to determine, based on the second human interface device being configured to generate the type of input event equivalent to the type of input event generated by the first human interface device, that the second human interface device includes a potential malware attack vector. The system may also include at least one processor configured to execute the identification module, the detection module, the equivalence module, and the determination module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a computing system that includes a first human interface device, 2) detect an introduction of a new device to the computing system that presents itself to the computing system as a second human interface device, 3) determine that the second human interface device is configured to generate a type of input event equivalent to the type of input event generated by the first human interface device, 4) determine, based on the second human interface device being configured to generate the type of input event equivalent to the type of input event generated by the first human interface device, that the second human interface device includes a potential malware attack vector.

As will be explained in greater detail below, by identifying the introduction of devices to computing systems that present to the computing systems as human interface devices of a type already extant in the computing systems, the systems and methods described herein may use the redundancy of apparent human interface devices as a factor in suspecting new devices of maliciousness. In some examples, these systems and methods may conduct more intensive analyses of inputs from redundant human interface devices to identify non-human inputs. In these examples, these systems and methods may suspect apparent human interface devices of being malicious devices based on the non-human inputs.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
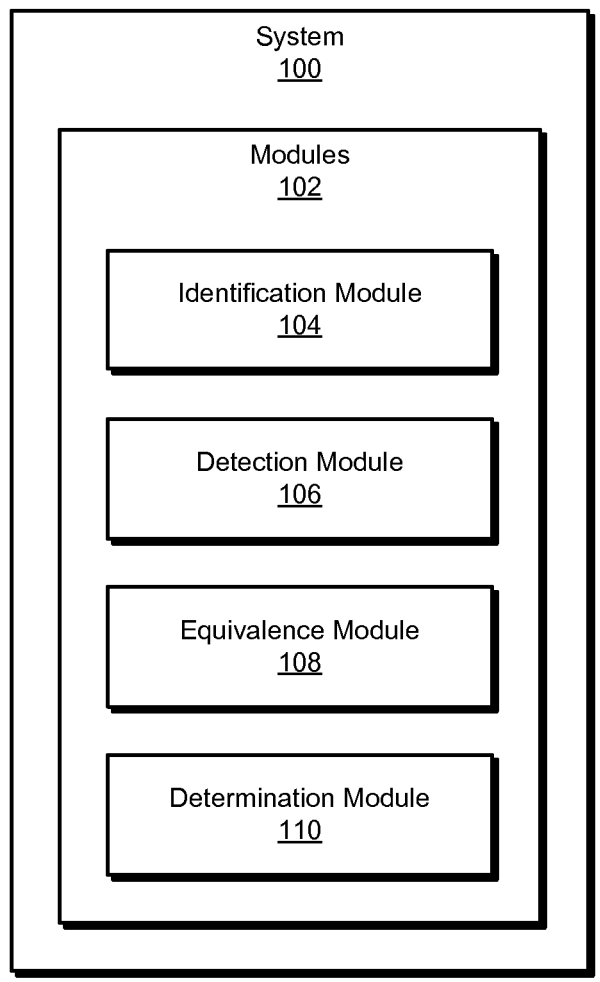
FIG. 1 is a block diagram of an exemplary system for identifying malware threat vectors.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
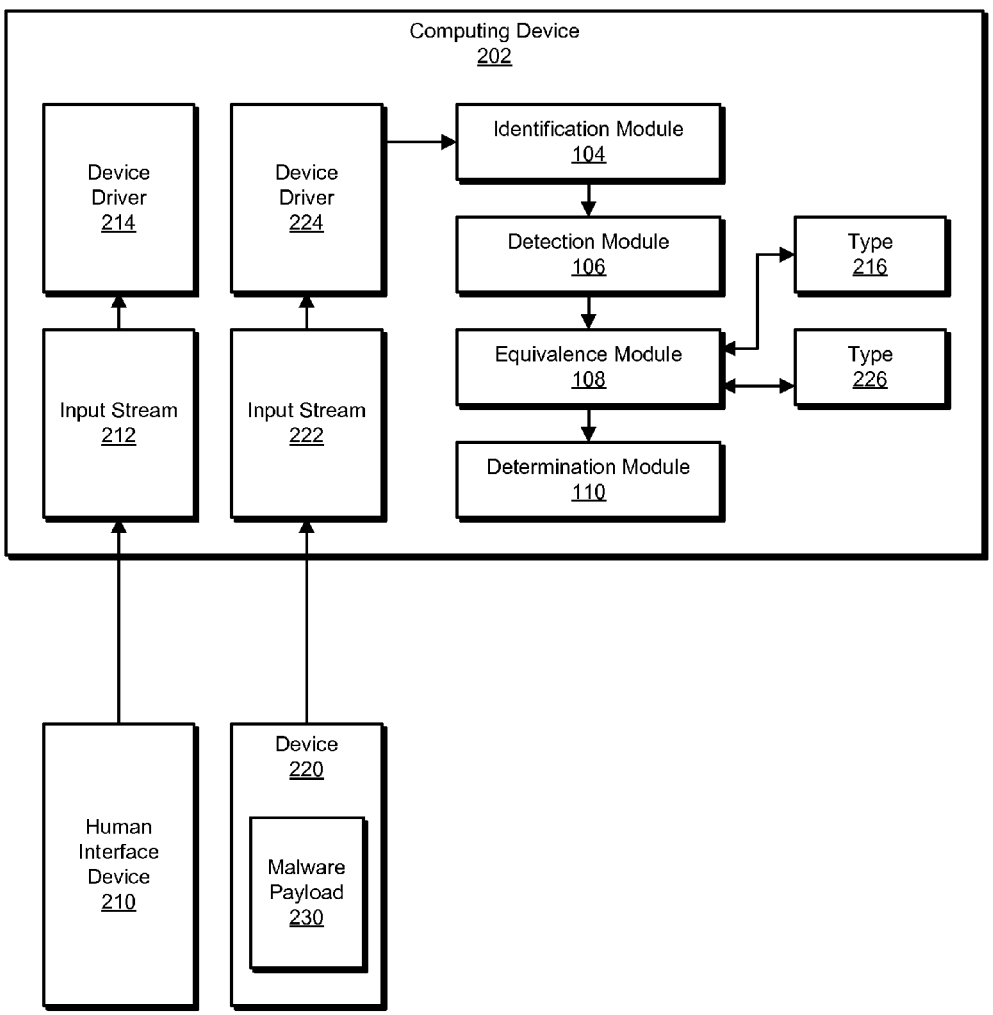
FIG. 2 is a block diagram of an exemplary system for identifying malware threat vectors.

The following will provide, with reference to FIGS. 1-2, detailed descriptions of exemplary systems for identifying malware threat vectors. Detailed descriptions of corresponding computer-implemented methods will also be provided in connection with FIG. 3. Detailed descriptions of exemplary inputs will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for identifying malware threat vectors. As illustrated in this figure, exemplary system 100 may include one or more modules 102 for performing one or more tasks. For example, and as will be explained in greater detail below, exemplary system 100 may include an identification module 104 programmed to identify a computing system that includes a first human interface device. Exemplary system 100 may also include a detection module 106 programmed to detect an introduction of a new device to the computing system that presents itself to the computing system as a second human interface device.

In addition, and as will be described in greater detail below, exemplary system 100 may include an equivalence module 108 programmed to determine that the second human interface device is configured to generate a type of input event equivalent to the type of input event generated by the first human interface device. Exemplary system 100 may also include a determination module 110 programmed to determine, based on the second human interface device being configured to generate the type of input event equivalent to the type of input event generated by the first human interface device, that the second human interface device includes a potential malware attack vector. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 illustrated in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 with a newly connected device 220.

In one embodiment, one or more of modules 102 from FIG. 1 may, when executed by at least one processor of computing device 202, facilitate computing device 202 in identifying malware threat vectors. For example, and as will be described in greater detail below, one or more of identification module 104, detection module 106, equivalence module 108, and determination module 110 may cause computing device 202 to 1) identify system 200 that includes a human interface device 210, 2) detect an introduction of device 220 to system 200 that presents itself to system 200 as a second human interface device, 3) determine that device 220 is configured to generate an input-event type 216 (e.g., in an input stream 222 and handled by a device driver 224) equivalent to an input-event type 226 generated by the human interface device 210 (e.g., in an input stream 212 and handled by a device driver 224), 4) determine, based on device 220 being configured to generate input-event type 226 equivalent to input-event type 216 generated by human interface device 210, that device 220 includes a potential malware attack vector (e.g., for delivering a malware payload 230).

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 510 in FIG. 5, or any other suitable computing device.

Human interface device 210 generally represents any type or form of input device. Examples of human interface device 210 include, without limitation, keyboards, pointing devices (e.g., mice, touchpads, trackballs, etc.), touchscreens, cameras, microphones, remote control receivers, or any other suitable input device.

Figure 3:
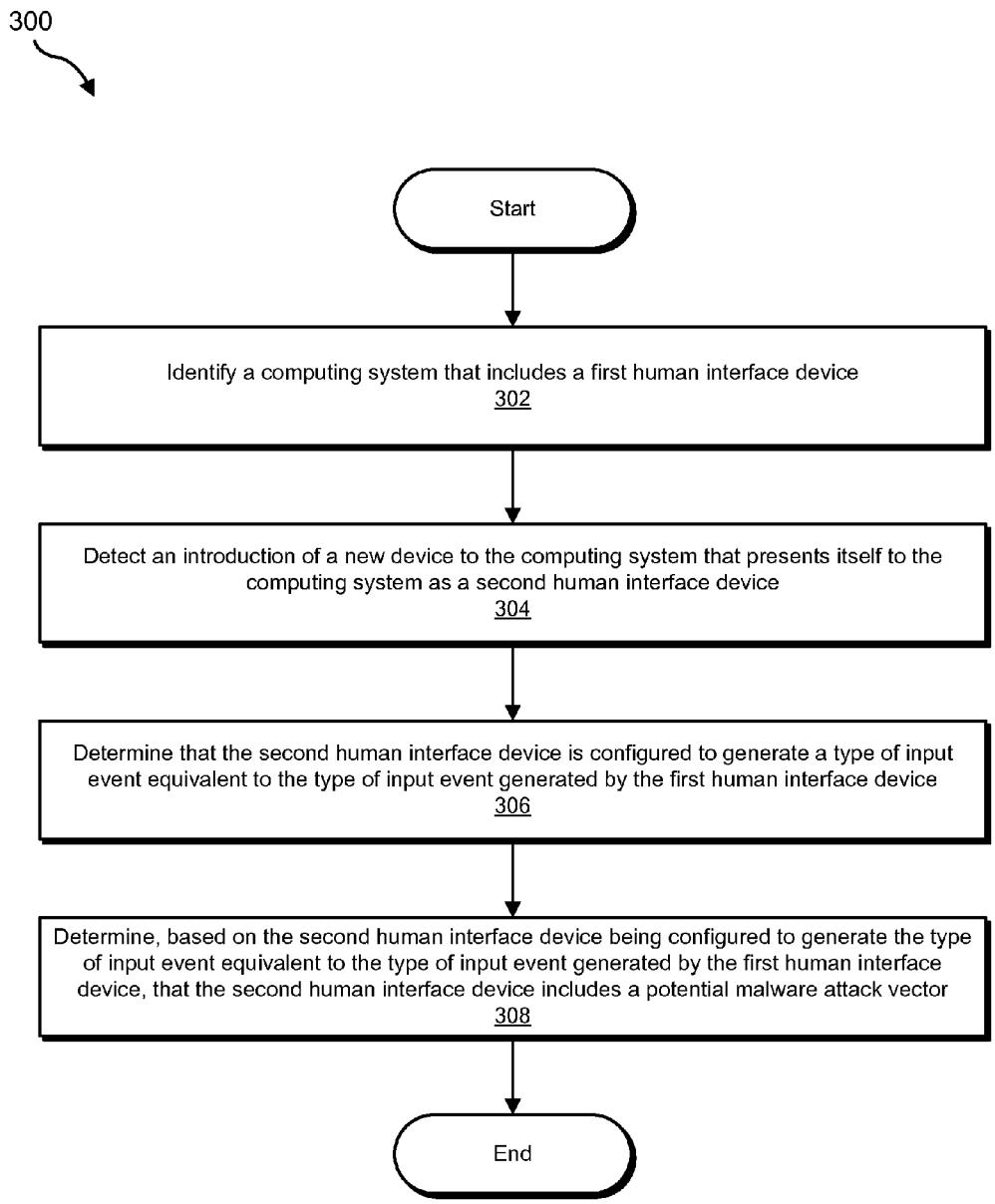
FIG. 3 is a flow diagram of an exemplary method for identifying malware threat vectors.

FIG. 3 is a flow diagram of an exemplary computer-implemented method 300 for identifying malware threat vectors. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a computing system that includes a first human interface device. For example, at step 302 identification module 104 may, as part of computing device 202 in FIG. 2, identify system 200 that includes human interface device 210.

As used herein, the phrase "human interface device" may refer to any type or form of input device configured to relay human-generated input to a computing system and/or configured to represent a device capable of relaying human-generated input to a computing system. Examples of human interface devices include, without limitation, keyboards, pointing devices (e.g., mice, touchpads, trackballs, etc.), touchscreens, cameras, microphones remote control receivers, or any other suitable input device. In some examples, a human interface device may include a single device connectable by wire to a computing system. Additionally or alternatively, a human interface device may include a receiving device for connecting to a computing system and an input device for receiving human input and wirelessly relaying the input to the receiving device.

Identification module 104 may identify the computing system that includes the first human interface device in any suitable manner. For example, identification module 104 may identify the computing system by executing on the computing system. In some examples, identification module 104 may identify the first human interface device. For example, identification module 104 may identify the first human interface device by identifying a driver configured for the first human interface device and/or a configuration of such a driver. In some examples, identification module 104 may identify the first human interface device by reading from a database indicating that the first human interface device is connected to the computing system.

At step 304 one or more of the systems described herein may detect an introduction of a new device to the computing system that presents itself to the computing system as a second human interface device. For example, at step 304 detection module 106 may, as part of computing device 202 in FIG. 2, detect an introduction of device 220 to system 200 that presents itself to system 200 as a second human interface device.

The new device may include any of a variety of devices. In some examples, the new device may include a device programmed to generate input events in computing systems without providing a human interface for generating the input events. For example, the new device may include a universal serial bus device with a microcontroller that is programmed to send input events (e.g., keystrokes, mouse movements, mouse clicks, etc.) when attached to a computing system. In some examples, the input events generated by the new device may be configured to deliver a malicious payload to a computing system. For example, the input events may be configured to access a malicious resource from the computing system (e.g., to download and/or install malware onto the computing system, to navigate to and/or retrieve spam, etc.). Additionally or alternatively, the input events may be configured to send sensitive information from the computing system to a predetermined attacking system. In some examples, the new device may be configured to generated the input events quickly (e.g., such that a user is less likely to observe and/or interfere with the input events) and/or after a time delay. In at least one example, the new device may be configured to emulate a signature of a legitimate human interface device (e.g., such that an operating system may attempt to automatically install a driver for the new device when the new device is introduced). In this manner, the new device may present itself to the computing system as the second human interface device.

Detection module 106 may detect the introduction of the new device in any of a variety of ways. For example, detection module 106 may identify an installation of a driver for the second human interface device on the computing system. Detection module 106 may identify the installation of the driver in any suitable manner. For example, detection module 106 may identify evidence of the installation in an operating system registry. Additionally or alternatively, detection module 106 may operate as a part of and/or receive a message from an event handler indicating that the new device has been introduced and/or connected to the computing system.

In some examples, detection module 106 may also configure the computing system to inspect and/or block input from the new device upon detecting the introduction of the new device. For example, detection module 106 may attach a filter driver to a driver for the new device to inspect input, block suspicious input, block all input, etc.

Returning to FIG. 3, at step 306 one or more of the systems described herein may determine that the second human interface device is configured to generate a type of input event equivalent to the type of input event generated by the first human interface device. For example, at step 306 equivalence module 108 may, as part of computing device 202 in FIG. 2, determine that device 220 is configured to generate an input-event type 216 (e.g., in input stream 222 and handled by device driver 224) equivalent to input-event type 226 generated by the human interface device 210 (e.g., in input stream 212 and handled by device driver 224).

As used herein, the term "type" as used with reference to input events may refer to any categorization and/or classification of input events. For example, keyboard-type input events may include input events (e.g., key presses, key releases, etc.) typically generated by keyboards, pointer-type input events may include input events (e.g., clicks, scrolling, etc.) typically generated by pointer devices, etc.

Equivalence module 108 may identify the types of the first and second human interface devices in any suitable manner. For example, equivalence module 108 may identify a device class of the first human interface device and a device class of the second human interface device. For example, equivalence module 108 may identify the device classes of the first and second human interface devices based on drivers installed for the first and second human interface devices and/or operating system registry entries for the first and second human interface devices (e.g., a generic mouse driver, a generic keyboard driver, etc.). In some examples, equivalence module 108 may identify the device classes by monitoring input generated by the first and second human interface devices.

Equivalence module 108 may determine that the respective types of the first and second human interface devices are equivalent based on any of a variety of factors. In some examples, equivalence module 108 may determine that the respective types are equivalent when the functionality of the first and second human interface devices are equivalent (e.g., both are typing devices, both are pointer devices, etc.). Additionally or alternatively, equivalence module 108 may determine that the respective types are equivalent only when the human interface form factors of the respective devices are equivalent (e.g., equivalence module 108 may determine that two mice are equivalent, but that a trackpad and a mouse are not equivalent). For example, a user who already has access to a built-in trackpad on a laptop may wish to use a separate mouse for a pointer device. Generally, equivalence module 108 may determine that the second human interface device is equivalent to the first human interface device whenever the second human interface device may be redundant given the existence of the first human interface device (e.g., because the second human interface device does not offer any substantial function and/or form not already provided by and/or inferior to the first human interface device).

Returning to FIG. 3, at step 308 one or more of the systems described herein may determine, based on the second human interface device being configured to generate the type of input event equivalent to the type of input event generated by the first human interface device, that the second human interface device includes a potential malware attack vector. For example, at step 308 determination module 110 may, as part of computing device 202 in FIG. 2, determine, based on device 220 being configured to generate input-event type 226 equivalent to input-event type 216 generated by human interface device 210, that device 220 includes a potential malware attack vector (e.g., for delivering malware payload 230).

Determination module 110 may determine that the second human interface device includes a potential malware attack vector in any of a variety of ways. For example, determination module 110 may determine that the second human interface device includes a potential malware attack vector simply based on the equivalence between the types of the first and second human interface devices.

In some examples, determination module 110 may base the determination that the second human interface device includes a potential malware attack vector based at least in part on 1) identifying a set of inputs generated by the second human interface device to the computing system, 2) identifying at least one expected attribute of human-generated inputs provided by the second human interface device, and 3) analyzing the set of inputs to determine that the set of inputs does not have the expected attribute. For example, as mentioned earlier, one or more of the systems described herein may intercept inputs generated by the second human interface device (e.g., by attaching a filter driver to a driver installed for use by the second human interface device). In this example, determination module 110 may analyze these captured inputs to determine whether the inputs are likely to have been generated by a human user and/or whether the inputs are likely to have been initiated from within the second human interface device (e.g., by a microcontroller).

The expected attribute may include any of a variety of attributes, including 1) a frequency of input, 2) a timing of input, 3) a precision of input, and/or 4) an accuracy of input. For example, determination module 110 may determine that the frequency of input performed by the device is above a predetermined threshold, indicating that the input is likely computer-generated instead of human-generated. As another example, determination module 110 may determine that the input is precise (e.g., a pointer device specifying precise movements and/or locations beyond the likely capabilities of a human user, based on the use of granular coordinates (e.g., multiples of 16), straight paths, interactions with corners and/or edges of interface elements, etc. In some examples, determination module 110 may determine that the timing of the input indicates computer-generated input over human-generated input. For example, determination module 110 may determine that the second human interface device generates inputs at regular intervals (e.g., clock-based intervals) rather than irregular intervals. In some examples, determination module 110 may determine that the accuracy of the input indicates computer-generated input instead of human-generated input (e.g., no use of backspaces, no pointer movement reversals, etc.).

Determination module 110 may determine that the set of inputs do not have the expected attribute in any of a variety of ways. For example, determination module 110 may identify a predetermined formula and/or algorithm for determine whether one or more features of the set of inputs indicates computer-generated input or human-generated input. Additionally or alternatively, determination module 110 may base the expected attribute on previous observations of human input. For example, determination module 110 may identifying a history of input provided via the first human interface device and then analyzing the history of input to extract the expected attribute. In some examples, determination module 110 may compare an entropy of the historical inputs from the first human interface device with an entropy of the set of inputs from the second human interface device and determine that the entropy of the set of inputs is greater than a predetermined distance from the entropy of the historical inputs.

Figure 4:
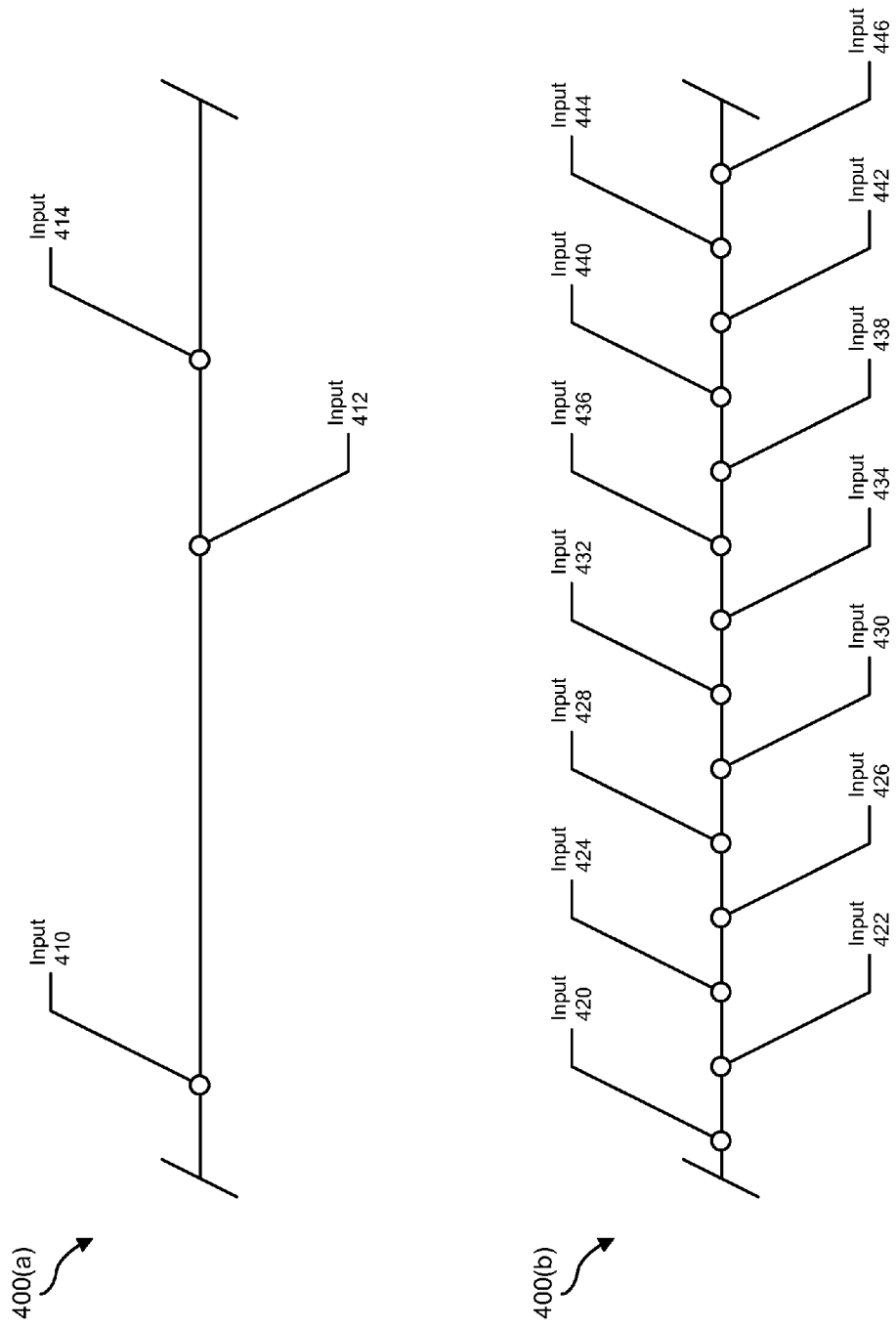
FIG. 4 is an illustration of exemplary inputs from input devices.

FIG. 4 illustrates exemplary input data 400(*a*) from the first human interface device and exemplary input data 400(*b*) from the second human interface device. As shown in FIG. 4, exemplary input data 400(*a*) may include inputs 410, 412, and 414. Exemplary input data 400(*b*) may include inputs 420, 422, 424, 426, 428, 430, 432, 434, 436, 438, 440, 442, 444, and 446. Using FIG. 4 as an example, determination module 110 may determine that the frequency of the inputs within input data 400(*b*) is above a predetermined threshold, indicating potentially computer-generated input (e.g., as opposed to the relatively lower frequency of the inputs within input data 400(*a*)). Additionally or alternatively, determination module 110 may determine that the timing of the inputs within input data has a regularity that exceeds a predetermined threshold (e.g., the time between an input and the subsequent input tends to be the same, whereas the timing of inputs within input data 400(*a*) tend to be irregular). Accordingly, determination module 110 may determine that input data 400(*b*) reflects computer-generated inputs instead of human-generated inputs (or, e.g., the probability of computer-generated inputs exceeds a predetermined threshold).

In some examples, determination module 110 may also block at least one input from the second human interface device based at least in part on determining that the second human interface device includes the potential malware attack vector. For example, determination module 110 may prevent any input from the second human interface device from registering with an operating system of the computing system. Additionally or alternatively, determination module 110 may block specific inputs from the second human interface device that appear to be computer-generated (e.g., rapid and/or precise inputs).

In some examples, determination module 110 may also prompt a user to input, via a human interface device apart from the second human interface device, whether to allow input from the second human interface device. For example, determination module 110 may display a warning that the new device is posing as a human interface device but appears to be generating computer-generated input. If the user indicates that the inputs generated by the device were human-generated, determination module 110 may allow input from the device. Otherwise, determination module 110 may block activity from the device, and/or display a prompt to remove the device. In some examples, determination module 110 may also increase a risk factor for future apparent human interface devices (e.g., by lowering a threshold to suspect and/or block apparent human interface devices).

In some examples, the determination module 110 may also prompt a user to indicate whether the new device is a human interface device. For example, determination module 110 may report the apparent type of the second human interface device and query a user whether a human interface device of the apparent type was recently connected to the computing system. If the user indicates that the new device is a human interface device, determination module 110 may allow input from the device. Otherwise, determination module 110 may block activity from the device, and/or display a prompt to remove the device. In some examples, determination module 110 may also increase a risk factor for future apparent human interface devices (e.g., by lowering a threshold to suspect and/or block apparent human interface devices).

As explained above, by identifying the introduction of devices to computing systems that present to the computing systems as human interface devices of a type already extant in the computing systems, the systems and methods described herein may use the redundancy of apparent human interface devices as a factor in suspecting new devices of maliciousness. In some examples, these systems and methods may conduct more intensive analyses of inputs from redundant human interface devices to identify non-human inputs. In these examples, these systems and methods may suspect apparent human interface devices of being malicious devices based on the non-human inputs.

Figure 5:
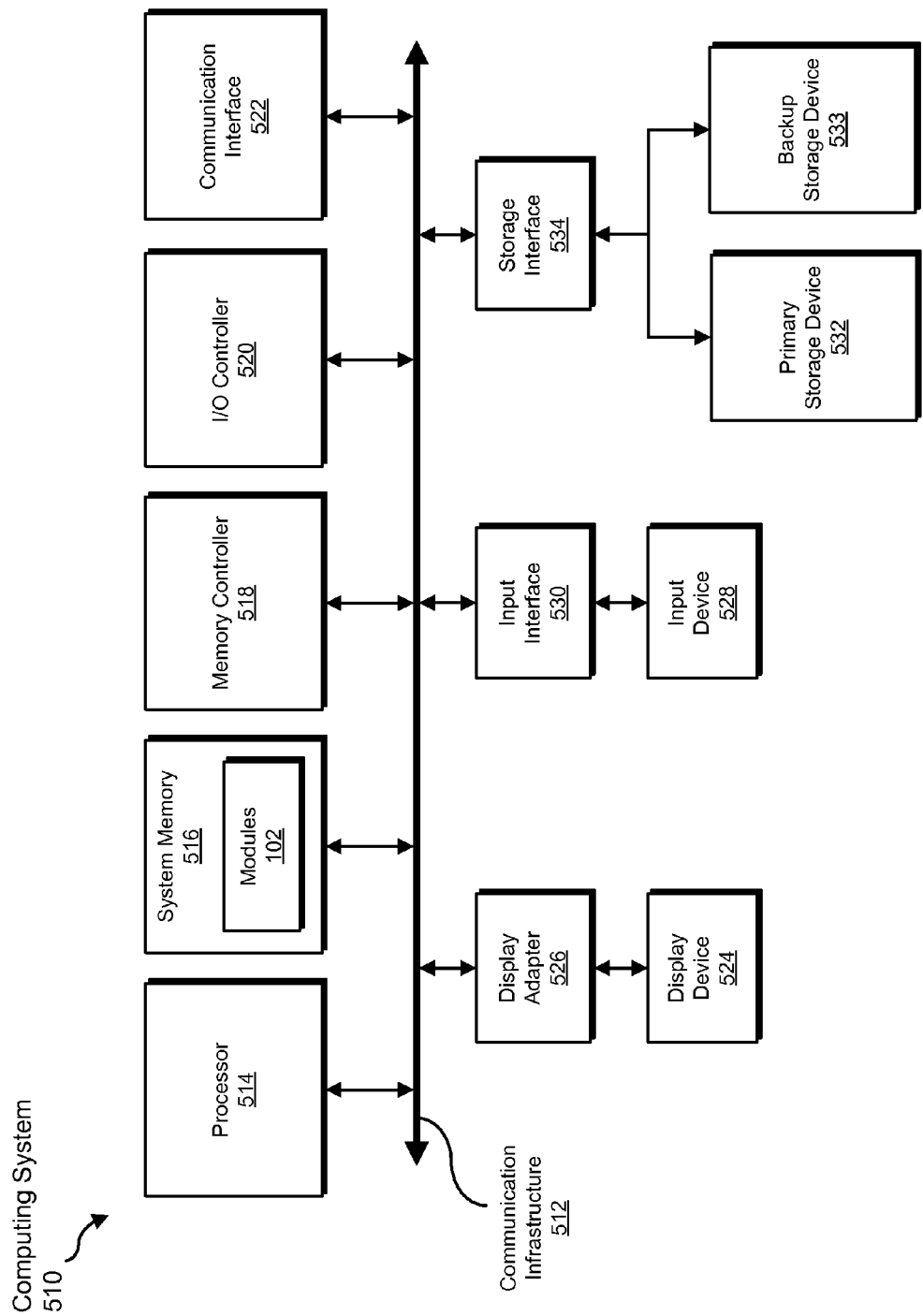
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, detecting, determining, analyzing, prompting, and blocking steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
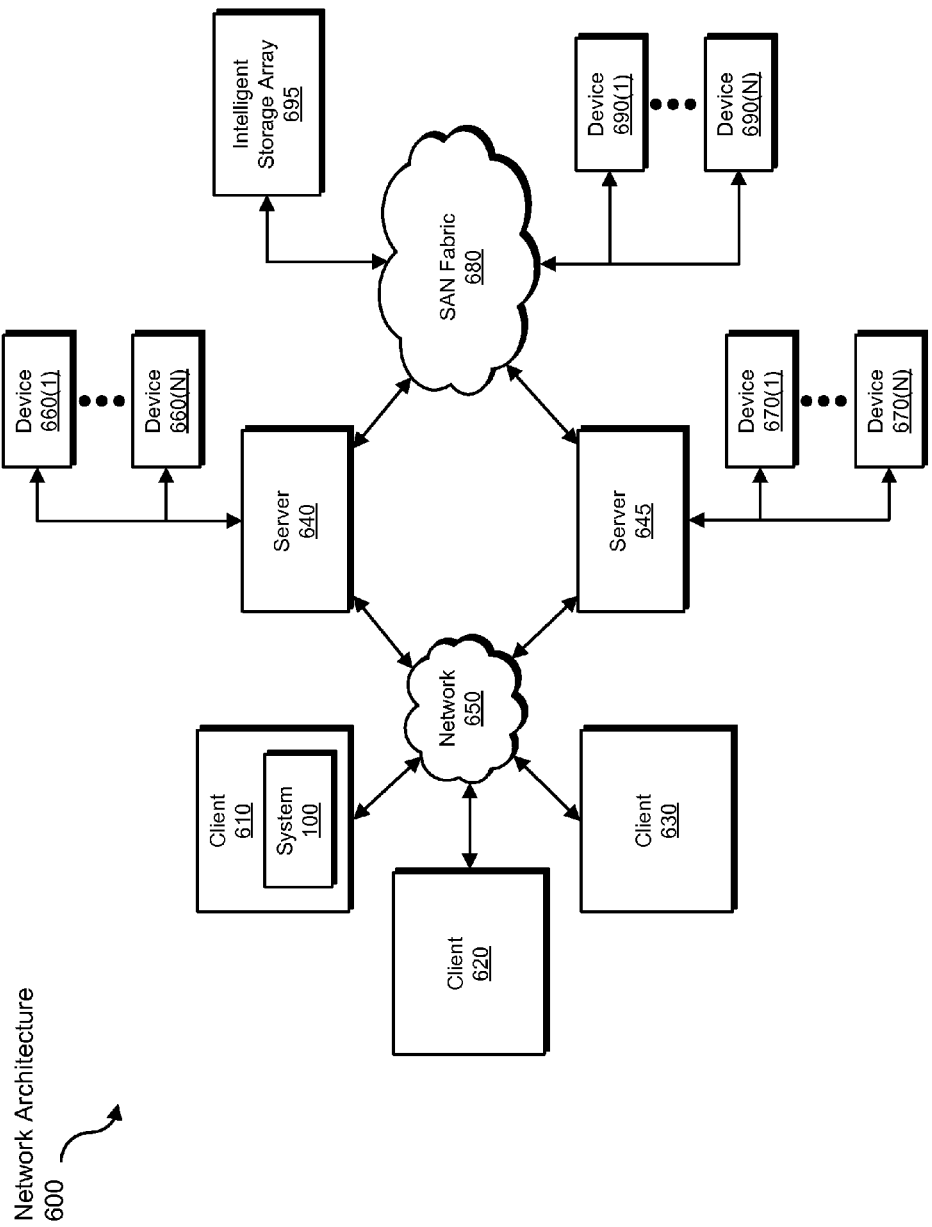
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, detecting, determining, analyzing, prompting, and blocking steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for identifying malware threat vectors.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for identifying malware threat vectors.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for identifying malware threat vectors, at least a portion of the method being performed by a computing device comprising at least one processor, the method comprising:
   identifying a computing system that comprises a first human interface device;
   detecting an introduction of a new device to the computing system that presents itself to the computing system as a second human interface device;
   determining that the second human interface device is configured to generate a type of input event equivalent to a type of input event generated by the first human interface device;
   determining, based on the second human interface device being configured to generate the type of input event equivalent to the type of input event generated by the first human interface device, that the second human interface device comprises a potential malware attack vector.

2. The computer-implemented method of claim 1, wherein determining that the second human interface device comprises the potential malware attack vector further comprises:
   identifying a set of inputs generated by the second human interface device to the computing system;
   identifying at least one expected attribute of human-generated inputs provided by the second human interface device;
   analyzing the set of inputs to determine that the set of inputs does not have the expected attribute.

3. The computer-implemented method of claim 2, wherein the expected attribute comprises at least one of:
   a frequency of input;
   a timing of input;
   a precision of input;
   an accuracy of input.

4. The computer-implemented method of claim 2, wherein identifying the expected attribute comprises:

identifying a history of input provided via the first human interface device;

analyzing the history of input to extract the expected attribute.

5. The computer-implemented method of claim 1, further comprising blocking at least one input from the second human interface device based at least in part on determining that the second human interface device comprises the potential malware attack vector.

6. The computer-implemented method of claim 1, wherein determining that the second human interface device is configured to generate a type of input event equivalent to a type of input event generated by the first human interface device comprises determining that the second human interface device does not offer any function that is not already provided by the first human interface device.

7. The computer-implemented method of claim 1, wherein detecting the introduction of the new device to the computing system comprises identifying one or more operating system registry entries for the second human interface device on the computing system.

8. The computer-implemented method of claim 1, wherein detecting the introduction of the new device to the computing system comprises identifying an installation of a driver for the second human interface device on the computing system.

9. A system for identifying malware threat vectors, the system comprising:
an identification module programmed to identify a computing system that comprises a first human interface device;
a detection module programmed to detect an introduction of a new device to the computing system that presents itself to the computing system as a second human interface device;
an equivalence module programmed to determine that the second human interface device is configured to generate a type of input event equivalent to a type of input event generated by the first human interface device;
a determination module programmed to determine, based on the second human interface device being configured to generate the type of input event equivalent to the type of input event generated by the first human interface device, that the second human interface device comprises a potential malware attack vector;
at least one hardware processor configured to execute the identification module, the detection module, the equivalence module, and the determination module.

10. The system of claim 9, wherein the determination module is programmed to determine that the second human interface device comprises the potential malware attack vector by further:
identifying a set of inputs generated by the second human interface device to the computing system;
identifying at least one expected attribute of human-generated inputs provided by the second human interface device;
analyzing the set of inputs to determine that the set of inputs does not have the expected attribute.

11. The system of claim 10, wherein the expected attribute comprises at least one of:
a frequency of input;
a timing of input;
a precision of input;
an accuracy of input.

12. The system of claim 10, wherein the determination module is programmed to identify the expected attribute by:

identifying a history of input provided via the first human interface device;

analyzing the history of input to extract the expected attribute.

13. The system of claim 9, wherein the determination module is further programmed to block at least one input from the second human interface device based at least in part on determining that the second human interface device comprises the potential malware attack vector.

14. The system of claim 9, wherein the determination module is further programmed to prompt a user to input, via a human interface device apart from the second human interface device, whether to allow input from the second human interface device.

15. The system of claim 9, wherein the determination module is further programmed to prompt a user to indicate whether the new device is a human interface device.

16. The system of claim 9, wherein the detection module is programmed to detect the introduction of the new device to the computing system by identifying an installation of a driver for the second human interface device on the computing system.

17. A non-transitory computer-readable-storage medium comprising one or more computer-executable instructions that, when executed by at least one processor of a computing device, cause the computing device to:
identify a computing system that comprises a first human interface device;
detect an introduction of a new device to the computing system that presents itself to the computing system as a second human interface device;
use an apparent redundancy of human interface devices as a factor in suspecting new devices of maliciousness by:
determining that the second human interface device is configured to generate a type of input event equivalent to a type of input event generated by the first human interface device, and
determining, based on the second human interface device being configured to generate the type of input event equivalent to the type of input event generated by the first human interface device, that the second human interface device comprises a potential malware attack vector.

18. The non-transitory computer-readable-storage medium of claim 17, wherein the one or more computer-executable instructions cause the computing device to determine that the second human interface device comprises the potential malware attack vector by further causing the computing device to:
identify a set of inputs generated by the second human interface device to the computing system;
identify at least one expected attribute of human-generated inputs provided by the second human interface device;
analyze the set of inputs to determine that the set of inputs does not have the expected attribute.

19. The non-transitory computer-readable-storage medium of claim 18, wherein:
the one or more computer-executable instructions cause the computing device to analyze one or more inputs from the second human interface device to identify one or more non-human inputs;
the determination that that the second human interface device comprises a potential malware attack vector is further based on the identification of the one or more non-human inputs.

20. The non-transitory computer-readable-storage medium of claim 17, wherein the input event comprises at least one of:
  an input event generated by a keyboard;
  an input event generated by a pointer device.

* * * * *